United States Patent [19]

Beckenbach et al.

[11] 4,431,407
[45] Feb. 14, 1984

[54] PROCESS FOR BURNING LIMESTONE, DOLOMITE OR THE LIKE AND ANNULAR SHAFT FURNACE FOR PERFORMING THE SAME

[76] Inventors: Ulrich Beckenbach, Fontanestr. 13; Helmuth Beckenbach, An den Linden 47, both of D-4005 Meerbusch 1, Fed. Rep. of Germany

[21] Appl. No.: 334,428

[22] Filed: Dec. 24, 1981

[30] Foreign Application Priority Data

Oct. 13, 1981 [DE] Fed. Rep. of Germany ....... 3140582

[51] Int. Cl.³ .................. F27D 1/08; F27D 15/02; F27B 15/00
[52] U.S. Cl. .......................................... 432/99; 432/79
[58] Field of Search .................. 432/14, 79, 96, 99; 423/173, 637

[56] References Cited

U.S. PATENT DOCUMENTS

| | | | |
|---|---|---|---|
| 3,033,545 | 5/1962 | Azbe | 432/79 |
| 3,142,480 | 7/1964 | Azbe | 432/79 |
| 3,204,936 | 9/1965 | Beckenbach | 432/79 |
| 4,205,459 | 6/1980 | Koseki et al. | 432/99 |
| 4,212,850 | 7/1980 | Deussner | 432/14 |
| 4,220,631 | 9/1980 | Serbent et al. | 423/637 |
| 4,315,735 | 2/1982 | Fussi et al. | 423/637 |

FOREIGN PATENT DOCUMENTS 1281111 10/1968 Fed. Rep. of Germany .

Primary Examiner—John J. Camby
Attorney, Agent, or Firm—Hill, Van Santen, Steadman & Simpson

[57] ABSTRACT

A process for burning and sintering material in lump form in a shaft furnace in which part of the cooling air flowing in a counterflow through the cooling zone is removed from the shaft furnace before the upper end of the cooling zone and is introduced into the column of material in the burning zone area, accompanied by a mixture of air and fuel. As a result a reducing furnace atmosphere is obtained, which extends up to the plane of the upper combustion chambers. The invention also relates to an annular shaft furnace for performing this process.

7 Claims, 1 Drawing Figure

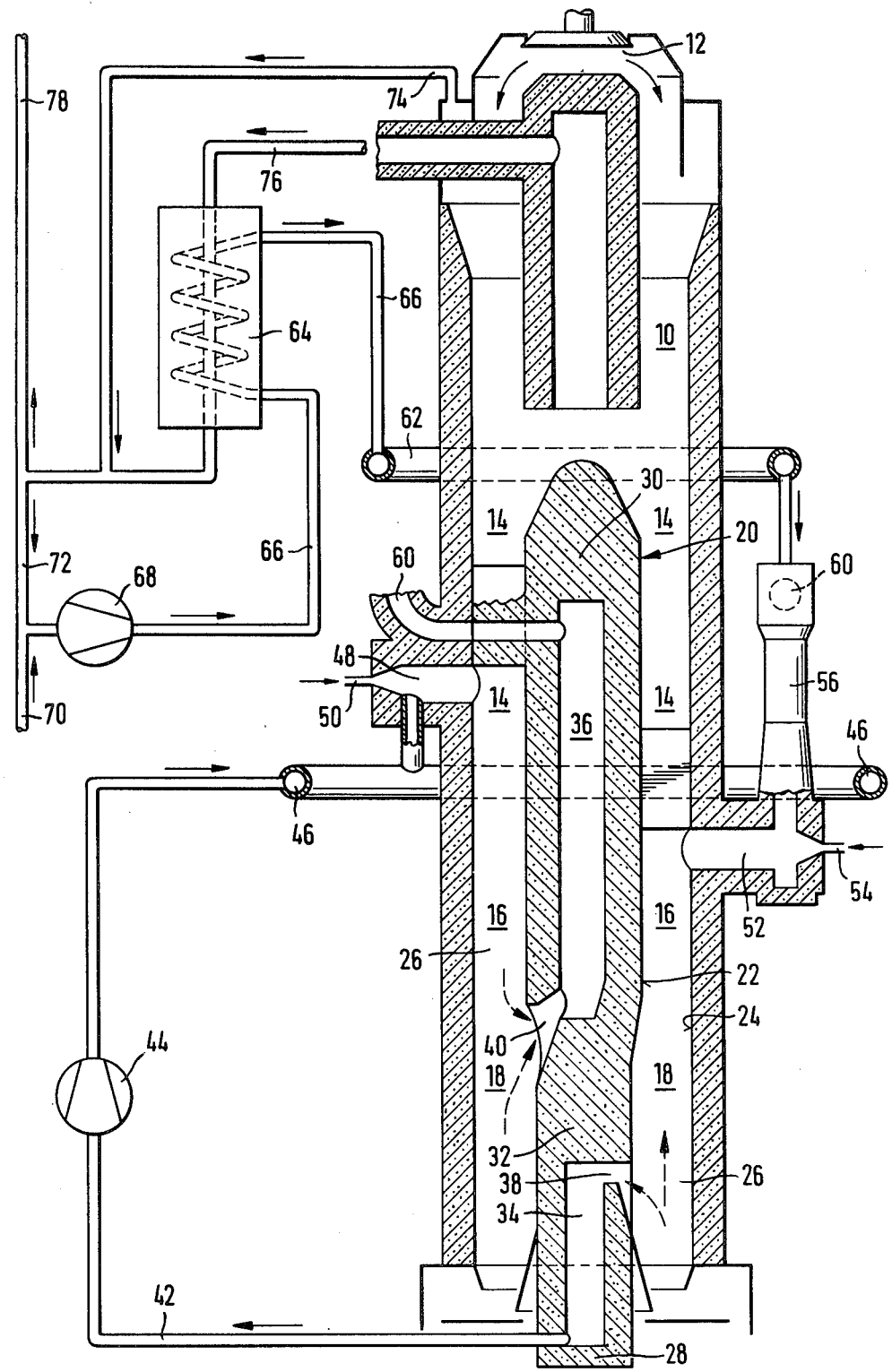

PROCESS FOR BURNING LIMESTONE, DOLOMITE OR THE LIKE AND ANNULAR SHAFT FURNACE FOR PERFORMING THE SAME

LIST OF REFERENCE NUMERALS

10—Preheating zone
12—Charging mechanism
14—Upper burning zone area
16—Lower burning zone area
18—Cooling zone
20—Shaft insert
22—Peripheral wall
24—Inner wall
26—Annular shaft
28—Base wall
30—Cover
32—Partition
34—Lower portion of shaft insert
36—Upper portion of shaft insert
38—Cooling air opening
40—Circulating gas opening
42—Cooling air line
44—Blower
46—Bustle pipe
48—Upper combustion chamber
50—Combustion device
52—Lower combustion chamber
54—Combustion device
56—Injector
60—Outlet channel or port
62—Bustle pipe
64—Recuperator
66—Line
68—Compressor
70—Primary air supply
72—Flue gas feed line
74—Furnace flue gas line
76—Recuperator line
78—Flue gas line The invention relates to an improvement in a process for burning and sintering material in lump form, which material is selected from a group consisting of limestone, dolomite and the like in a blast furnace in which the material successively passes through a preheating zone, a burning zone having an upper and a lower area and a cooling zone. At an upper end of the cooling zone of the furnace, a suction is placed on the cooling air, which is flowing from the bottom toward the top in a counterflow, and on fuel gases, which are uniformly flowing downward in the lower burning zone, to remove a mixture of the fuel gases and air, which mixture is reintroduced into the material column in the area of the lower burning zone. The reintroduced mixture has a part flowing upward and a downwrd flowing part which downward flowing part is again removed by the suction at the upper end of the cooling zone. Fuel is separately supplied in a controlled manner both to the fuel gases flowing upward to the upper area of the burning zone and to the gases which were reintroduced into the lower area of the burning zone in such a way that in the upper burning zone area and the lower burning zone area the combustion operation can take place with a different air excess or deficiency and consequently with a different temperature. The invention also relates to an improvement in an annular shaft furnace for burning and sintering material in lump form, which material is selected from a group consisting of limestone, dolomite and the like. The furnace has a preheating zone, a burning zone with an upper area and a lower area which areas are provided in two different planes, the furnace wall in each area has combustion chambers having burners supplied with fuel and combustion air, a cooling zone following the burning zone and having a lower cooling air is supplied. The furnace has a hollow shaft insert which is closed at the upper end which, between its outer peripheral wall and the inner wall of the furnace forms an annular shaft. The hollow shaft insert is subdivided by a partition into an upper and a lower portion with the lower end of the shaft insert being located in the cooling zone, whilst its upper end is positioned bove the upper burner plane. At the upper end of the cooling air zone, cooling air together with the fuel gases flowing downwards in uniform manner through the lower area of the burning zone enters the inner area of the insert via circulating gas openings and can be supplied from the inner air of the insert as a mixture of fuel and air to the combustion chambers of the lower burner plane, for performing the process.

German Pat. No. 12 81 111 describes a process and an annular shaft furnace of the aforementioned type. In this reference a working in the lower part of the lower burning zone area takes place with the circulation of gases and the fuel is separately supplied in controlled a manner both to the fuel gases flowing upwards to the upper area of the burning zone and to the fuel gases partly flowing upwards and partly flowing downwards to the lower area of the zone in such a way that in the upper burning zone an intense deacidification of the material takes place with a low amount of air excess and high temperature, whilst in the lower burning zone area the residual deacidification takes place with a high amount of air excess and low temperature.

It has been found that such a process and such an annular shaft furnace do not make it possible to produce burnt material and particularly lime with a very low sulphur content of the type which is required by many consumers and in particular the steel industry.

SUMMARY OF THE INVENTION

The object of the invention is to so further develop the process and annular shaft furnace of the aforementioned type that burnt material with an extremely low sulphur content can be obtained.

According to the invention this object or task is solved with an improvement in a process of the aforementioned type. The improvement comprises that part of the cooling air flowing in a counterflow through the cooling zone is removed from the shaft furnace prior to the upper end of the cooling zone and is introduced into the column of material in the upper burning zone area, accompanied by the admixing of air and fuel.

According to a preferred embodiment of the process according to the invention the quantity ratio of cooling air removed within the cooling zone on one hand and at the upper end of the cooling zone on the other hand can be adjusted for setting the CO-content in the upper burning zone area. Furthermore the air supplied to the lower and/or upper burning zone area can at least partly consist of flue or exhaust gases.

According to an optional feature of the invention the proportions of primary air and flue gas in the supply air is adjustable to enable setting the CO-content in the lower burning zone area.

Furthermore the aforementioned problem or object is solved in the case of an annular shaft furnace of the aforementioned type in that the lower portion of the shaft insert is sealed at its lower end from the inner area of the furnace to form a lower chamber, which is separated from the circulating gas openings in an upper chamber by the partition, that below the circulating gas openings within the cooling zone the shaft insert is provided with a cooling air opening for the partial suction of cooling air into the lower chamber, and that the cooling air which is sucked into the lower chamber of the insert can be supplied by means of a blower and optionally a bustle pipe to the combustion chambers of the upper burner plane.

A preferred embodiment of the annular shaft furnace according to the invention is characterized by injectors for the drawing off the gases flowing into to the upper portion or chamber of the shaft insert and includes residual cooling air and fuel gases of the lower burner plane being substoichiometrically burnt within the lower burner zone area and having a reducing atmosphere. In order to introduce these gases into the combustion chambers of the lower combustion chamber plane, a compressed, preheated mixture of a controllable composition of furnace flue gases that were removed from the upper end of the shaft furnace and primary air is suppliable as an expanding agent to said injectors.

In addition, the invention proposes an annular shaft furnace, characterized by a recuperator for preheating the mixture of furnace flue gases and primary air prior to being fed into the injectors of the lower combustion chamber group. A bustle pipe can be connected between the recuperator and the injectors.

In the case of the annular shaft furnace according to the invention part of the furnace flue gases can flow through the recuperator.

As a further development of the invention, the proportion of the cooling air drawn off by the cooling air openings on the one hand and the circulating air opening on the other can be adjustable.

Whereas in the prior art annular shaft furnace the fuel is burnt with an air excess in the lower burning zone area, i.e. in the vicinity of the lower combustion chamber plane, and whereas a substoichiometric burning takes place in the upper combustion chamber plane, the reverse procedure is adopted according to the present invention. The invention is based on the finding that it is possible to expel a high proportion of sulphur from sulphur-containing limestone during the actual burning process if there is a reducing atmosphere in the lower part of the burning zone, of a shaft furnace. Thus, according to the invention the known process is reversed in that the lower combustion chambers are operated substoichiometrically with a resulting air excess in the vicinity of the upper combustion chambers. As a result of the reducing operation in the lower combustion chambers, a reducing furnace atmosphere is obtained which, within the annular shaft if an annular shaft furnace is used, extends from the entrance of the circulating gases into the shaft insert up to the plane of the upper combustion chambers. Such a reducing, oxygen-free atmosphere with the resulting advantages attainable in the described manner, cannot be obtained with the hitherto known processes and shaft furnaces.

Further features and advantages of the invention can be gathered from the following description in which an embodiment is described in detail relative to the diagrammatic drawing.

BRIEF DESCRIPTION OF THE DRAWINGS

The FIGURE is a diagrammatic longitudinal cross-section of an annular shaft furnace in accordance with the present invention.

DESCRIPTION OF THE PREFERRED EMBODIMENTS

As is shown by the drawing, an annular shaft furnace has from top to bottom a preheating zone 10 into which the material to be burnt can be charged by means of a charging mechanism 12, a burning zone comprising an upper burning zone area 14 and a lower burning zone area 16, as well as a cooling zone 18. A shaft insert 20 is supported within the annular shaft furnace fundamentally in the manner described in German Pat. No. 12 81 111. An annular shaft or space 26 is formed between a peripheral outer wall or surface 22 of the shaft insert 20 and an inner surface or wall 24 of the outer furnace shell. The annular shaft 26 receives the material to be burnt which passes through the furnace from top to bottom. Shaft insert 20 which is substantially hollow is sealed at its lower end by a base wall 28 and at its upper end by a conically shaped cover 30. The shaft insert 20 is also subdivided into a lower hollow portion or chamber 34 and an upper hollow portion or chamber 36 by a partition 32. Annular shaft 26 is connected with the lower portion 34 of shaft insert 20 via cooling air openings 38, whilst at a higher point annular shaft 26 and the upper portion 36 of shaft insert 20 are connected by circulating gas openings 40.

A cooling air line or line 42 passes from the lower portion 34 of shaft insert 20 via a blower 44 to a bustle pipe 46 from which the preferably gas or oil-operated burners of upper combustion chambers 48 of an upper combustion chamber plane are supplied with air. The fuel is supplied to the combustion chambers 48 by means of combustion devices 50. Fuel is supplied to the lower combustion chambers 52 by means of combustion devices 54. The gases entering the circulating gas openings 40 are circulated by injectors 56. Outlet ports or channels 60 leading from the upper portion 36 of shaft insert 20 issue into injectors 56. A line 66 passes through a heat exchanger or recuperator 64 and discharges into a bustle pipe 62 which supplies heated gas under pressure to each of the injectors 56. The line 66 is placed under pressure by the action of a compressor 68, which is connected to a primary air supply 70 and a flue or exhaust gas feed line 72. The drawing also shows a furnace flue gas line 74 leading out of the annular shaft furnace at the upper end of the preheating zone 10 and the line 74 together with a recuperator line 76 discharges into the flue gas feed line 72. A flue gas line 78 removes the flue gases not consumed in the process.

The aforementioned annular shaft furnace operates in the following manner when performing the process according to the invention. A large part of the cooling air flowing upwardly in the cooling zone 18 in annular shaft 26 is drawn off via cooling air openings 38 into chamber 34 by means of blower 44 and is uniformly supplied to each upper combustion chamber 48 via bustle pipe 46. The remaining part of the cooling air continues to flow upwardly in the annular shaft 26 and, after entering the circulating gas openings 40, passes in per se known manner into the lower combustion chambers 52 where, unlike in the process known from German Pat. No. 12 81 111, due to the greatly decreased quantity of cooling air which enters, a reducing, i.e. oxygen-free, atmosphere is obtained, which flows in the annular shaft in such a way that it extends therein from the level of circulating gas openings 40 roughly to the plane of the upper combustion chambers 48. This reducing atmosphere is further adjustably reinforced in that, unlike in the prior art, the injectors 56 are no longer exclusively supplied with primary air as the expanding agent and are instead supplied by bustle pipe 62 in part with furnace flue gas and, as required, more or less primary air and the quantity of the latter can be controlled. The CO-proportion in the atmosphere in the annular shaft furnace can easily be adjusted in a range of approximately 0.5 to 5% CO. This can be brought about by correspondingly fixing the quantity of the primary air addition and/or by varying the quantity ratio of total cooling air flowing within the coling zone and the cooling air removed at the upper end of the cooling zone.

Part of the total furnace flue gas composed of the flue gases removed from the furnace by the furnace flue gas line 74 and by the flows via the flue gas feed line 72 into compressor 68. In the latter the flue gas portion is compressed together with a varying and correspondingly adapted quantity of primary air from the primary air supply line 70. The compressed flue gas and primary air is then preheated in the recuperator 64 and then introduced into the bustle pipe 62 from where the individual injectors 56 are supplied. The furnace flue gases which are not required for the return process in the aforementioned process according to the invention constitute the true flue gases of the furnace and leave the furnace via flue gas line 78. The flue gases in line 78, contain an increased proportion of carbon dioxide, such as cannot be obtained with the hitherto known process in the known annular shaft furnace, particularly as described in German Pat. No. 12 81 111. Thus, the invention makes it possible for a soda manufacturer to use the flue gas having an increased $CO_2$- content leaving the annular shaft furnace via flue gas line 78.

The features of the invention described in the above description, the drawing and claims can be essential to the realization of the different embodiments of the invention either singly or in random combinations.

We claim:

1. In an annular shaft furnace for burning and sintering material in lump form, which material is selected from a group consisting of limestone, dolomite and the like, said furnace from top to bottom having a preheating zone, an upper burning zone, a lower burning zone and a cooling zone having a supply of cooling air at its base for flowing upward toward the lower burning zone, each of said upper and lower burning zones having cumbustion chambers with burners lying in a plane with the planes being spaced apart along the axis of the furnace, said furnace containing a substantially hollow shaft insert being closed at an upper end and coacting with the walls of the furnace to form an annular shaft at least in the area of the burning zones and cooling zones, said shaft insert being subdivided by a partition into an upper chamber and a lower chamber, said lower end of said shaft insert being located in the cooling zone while the upper end is positioned in the burning zone and terminates above the plane of the burners for said upper burning zone, said upper chamber of the shaft insert having circulating gas openings adjacent the upper end of the cooling zone with suction means for applying a suction to the chamber to draw a mixture of cooling air flowing upward in the cooling zone and fuel gases flowing downward from the lower burning zone into the gas openings to form a mixture of cooling air and fuel air flowing upward in said upper chamber, said furnace including means for introducing said mixture into the combustion chambers of the lower burner plane with the improvements comprising the lower chamber of the shaft insert being sealed at its lower end from the inner area of the furnace, said lower chamber having cooling air openings positioned below the circulating gas openings for receiving cooling air prior to reaching the upper end of the cooling zone, means including a suction blower for drawing cooling air through said cooling air openings downward in said lower chamber and then discharging said withdrawn cooling air into the combustion chambers at the upper burning zone; and said suction means including injectors discharging into the combustion chambers at the lower burning zone and means for supplying an expansion agent to said injectors including means for providing a compressed preheated mixture of a controllable composition of furnace flue gases from the upper end of the shaft furnace and primary air, said means for supplying being adjusted to cause a substoichiometrical burning of the fuel in the lower burner zone to create a reducing atmosphere.

2. In an annular shaft furnace according to claim 1, wherein the means for providing a compressed preheated mixture includes a recuperator for preheating a mixture of flue gases and primary air prior to being supplied to the injectors.

3. In an annular shaft furnace according to claim 2, wherein said means for providing a compressed preheated mixture includes a bustle pipe receiving the output of the recuperator and being connected to each of the injectors.

4. In an annular shaft furnace according to claim 3, wherein said recuperator has means for receiving furnace flue gases from the flow through the preheating zone.

5. In an annular shaft furnace according to claim 2, wherein said recuperator has means for receiving a portion of the furnace flue gases from the preheating zone flow to cause preheating of the mixture passing through the recuperator.

6. In an annular shaft furnace according to claim 1, wherein said means for providing is adjustable to enable providing a preheated mixture having a small amount of oxygen for each injector so that the gas being supplied in the lower burning zone has the desired CO content.

7. In an annular shaft furnace according to claim 1, which includes means for adjusting the ratio of the cooling air drawn off through the cooling air openings and the circulating openings.

* * * * *